United States Patent [19]
Brock

[11] Patent Number: 5,800,020
[45] Date of Patent: Sep. 1, 1998

[54] INFANT POSTURE SUPPORT DEVICE

[76] Inventor: Elvetia C. Brock, 1605 Hampton South, Apt. B308, Colorado Springs, Colo. 80906

[21] Appl. No.: 742,418
[22] Filed: Oct. 7, 1996
[51] Int. Cl.⁶ ..................................................... A47D 15/00
[52] U.S. Cl. .............. 297/488; 297/256.15; 297/256.17; 297/467; 5/655
[58] Field of Search ............................... 297/256.15, 467, 297/488, 464, 487, 256.17, 219.12, 397, 284.3; 5/655

[56] References Cited

U.S. PATENT DOCUMENTS

| | | | |
|---|---|---|---|
| 2,402,505 | 7/1946 | Knecht | 297/467 |
| 2,859,048 | 11/1958 | Munn | 297/488 |
| 3,619,362 | 11/1971 | Low | 297/488 |
| 4,666,207 | 5/1987 | Quartano | 297/198 |
| 4,927,211 | 5/1990 | Bolcerek | 297/467 |
| 5,345,633 | 9/1994 | Harnish | 297/397 |

*Primary Examiner*—Peter M. Cuomo
*Assistant Examiner*—Anthony D. Barfield
*Attorney, Agent, or Firm*—Ramon L. Pizarro; Edwin H. Crabtree

[57] ABSTRACT

A posture support apparatus for supporting the posture of an infant while in an infant transport device that includes a front portion a straddleable support portion and a cross member adapted for extending across the front portion of the infant transport device. The posture support apparatus includes a longitudinal body which is preferably filled with cushion material, a first strap attached near an end of the longitudinal body, a second strap attached to the longitudinal body near another end, and a stabilization pad attached to the mid-portion of the longitudinal body. The stabilization pad is adapted for attachment to the straddleable support portion of the infant transport device, so that the first strap and the second strap may be extended over the cross member of the infant transport device to hold the posture support apparatus against the posture support apparatus and the stabilization pad attached to the straddleable support portion of the infant transport device to retain the posture support apparatus in a desired position relative to the infant transport device.

19 Claims, 4 Drawing Sheets

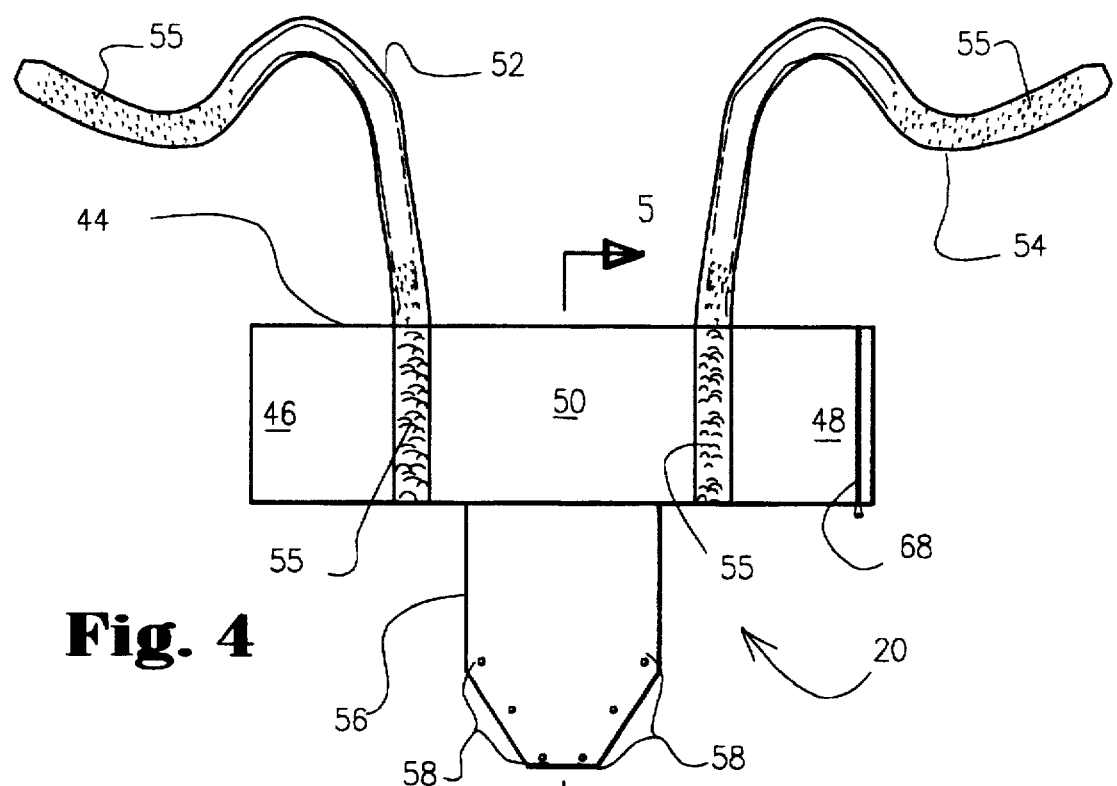
Fig. 4
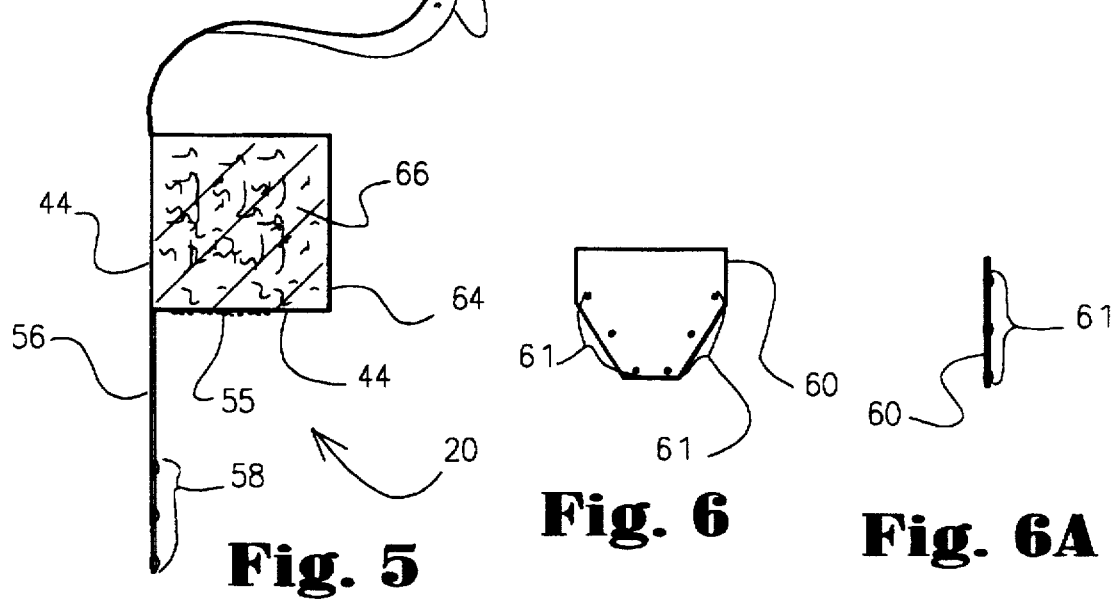
Fig. 5   Fig. 6   Fig. 6A

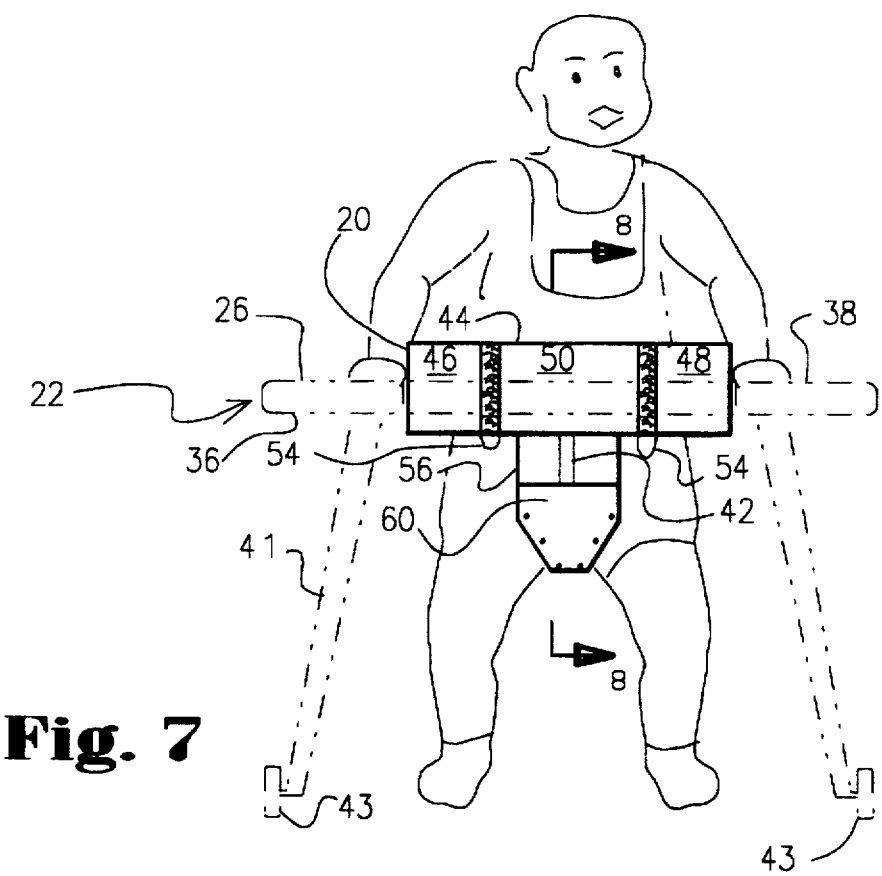
Fig. 7
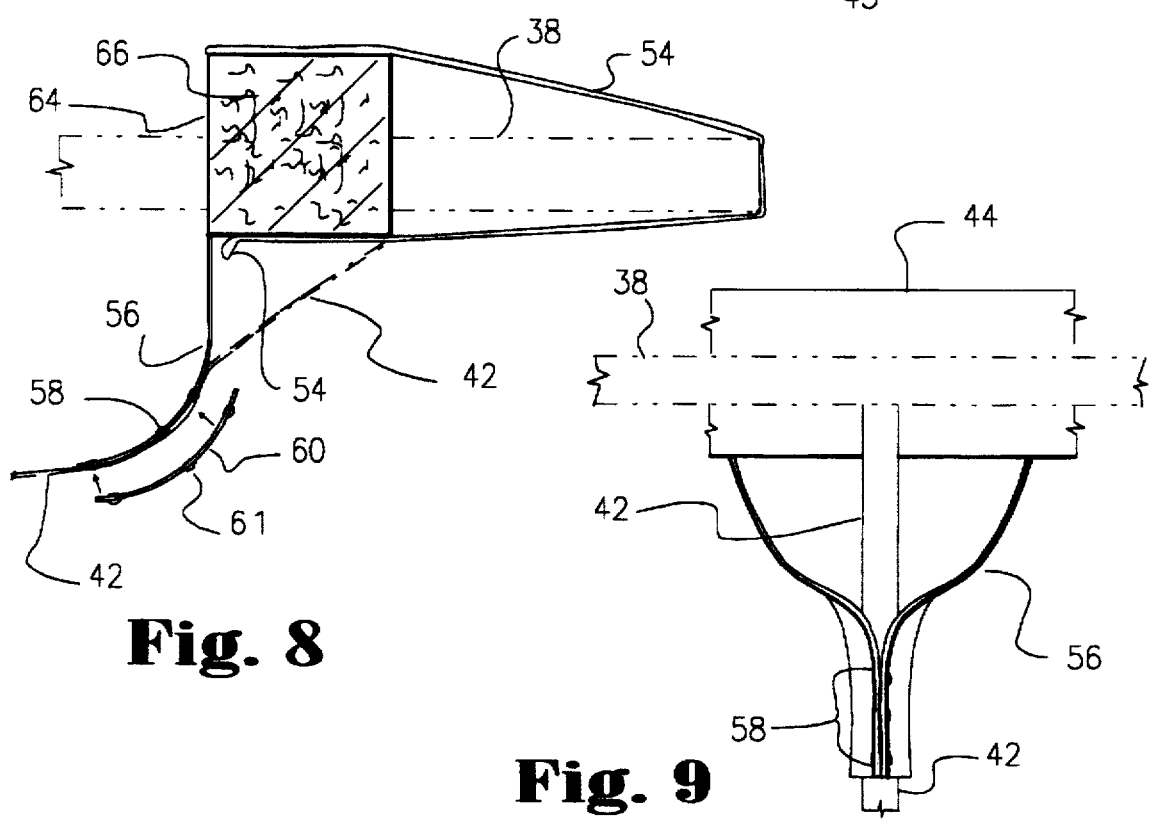
Fig. 8
Fig. 9

INFANT POSTURE SUPPORT DEVICE

BACKGROUND OF THE INVENTION (a) Field of the Invention

This invention generally relates to an apparatus for supporting the torso area of an infant in a walker, stroller or the like, and more particularly, but not by way of limitation, to a universal cushioned support device for supporting the infant's torso in an upright position.

(b) Discussion of known Prior Art

Many devices designed to carry or transport infants are made with proportions that allow the same device to be used by children of many ages and sizes. Examples of the devices for transporting or carrying small children include baby carriages, walkers, baby swings, and automobile child restraint seats. One of the most serious drawbacks of these devices is that to allow for proportions that allow many different children use the device, the devices tend to provide little support for the infant's torso in order to keep the infant from leaning too far forward.

However, it should be noted that automobile child restraint seats, since they are designed to retrain the child's body, typically do provide a significant amount of support and restraint by way of including many straps and buckles that keep the child tied down. These restraints, however, are often too restrictive for situations where the automobile child restraint seat is being used to simply carry or seat the child outside the automobile.

Other well known devices for transporting children, such as the stroller or the children's walker, typically do not lend support to the child's torso. Especially absent in these devices are means for keeping the child from leaning or falling forward. This problem has been recognized, and devices to alleviate its effect on a the child have been previously discovered. For example, in U.S. Pat. No. 3,788,699 to Starr a support cushion for use in seats such as children's high chairs, wheelchairs having arms, and the like is taught. The Starr device includes a piece resilient material which has been dimensioned to overlie the arms and cross member of the seat. The piece of resilient material includes flanges which can be used with straps to help maintain the device at the desired position over the chair.

While the Starr device does help fill and pad around the user's body, it leaves problems dealing with hygiene and universal applicability unsolved. An important problem which must be addressed by a device which can be used to support infants and the infirm is that the device must be easily washable. Infants, especially, can spill food, fluids or other materials on the device. Proper cleaning of the device will prevent spreading of disease and allow the child or the infirm to wear a clean support device in a dignified manner. Thus the one piece foam construction can present problems with cleaning since its flanged shape and construction will not allow easy washing in known washing machines, for example. Also, the one piece flanged construction will not allow the universal usage of the device. This is a serious drawback, since it will require that supplier's carry many different sizes and shapes of the device or will require that the user purchase a chair that will fit the device.

Another known device which is designed for supporting the user's body is taught in U.S. Pat. No. 5,529,383 to Laco. The Laco device, however requires the use of a bracket that is not easily mounted on a stroller, walker or the like. A device which could lend support to a child is taught in U.S. Pat. No. 4,143,915 to Kamlay. The Kamlay device, however, is not designed as a support device. Therefore, this device does not fit strollers or walkers and the like.

Other known device which can lend support to the user are taught in U.S. Pat. Nos. 5,098,161 to Minami et al., 5,080,441 to Stevenson et al., 5,026,115 to Barnes, 4,909,574 to Sedlack, 4,580,842 to Segal, 4,343,570 to Cone, and 4,342,483 to Takada. Many of these devices, however are designed to be used exclusively a particular type of automobile child restraint seat or are designed to support a child as he or she rests on a bed. Other known devices, such as U.S. Pat. No. 5,080,441 to Stevenson et al. teach a support device that attaches directly to the child, making it cumbersome for installing on the child.

Thus, a review of examples of the known prior art reveals that there remains a need for a simple, inexpensive device for helping infants sit upright when in a stroller, walker or the like. Importantly, there remains a need for a simple device which can fit strollers, walkers, automobile child restraint seat, without requiring that the user purchase a device that is especially fabricated for a particular stroller, walker or seat.

There remains a need for a posture support device which is easily washable in well known household type of washing machines.

Moreover, there remains a need for a support device that is comfortable and lightweight to the user.

SUMMARY

It has been discovered that the problems and needs left unsolved by the known prior art can be met by providing a posture support apparatus for supporting the posture of an infant while the infant is in an infant transport device, such as a stroller, a walker, swing, car seat or the like where the infant is held in a seat with a straddleable support and a member that extends across, in front of the infant. Thus the infant transport device is of the type that includes a front portion, a straddleable support portion and a cross member adapted for extending across the front portion of the infant transport device. The posture support apparatus includes at least the following elements:

a) a longitudinal body with a first end, a second end opposite the first end, and a mid-portion between the first end and the second end;

b) a first strap attached to the longitudinal body at a position between the first end and the mid-portion;

c) a second strap attached to the longitudinal body at a position between the mid-portion and the second end; and d) a stabilization pad attached to the mid-portion of said longitudinal body.

The stabilization pad is adapted for attachment to the straddleable support portion of the infant transport device, so that the stabilization pad cooperates with the first strap and the second strap to secure the posture support device when the first strap and the second strap are extended over the cross member of the infant transport device.

In a highly preferred embodiment of the device, the longitudinal body is a hollow pliable enclosure made from a polyester cover filled with a polyester fiber-fill padding or similar soft, resilient material. This combination of structure allows the device to be easily washed and disinfected.

It is also preferred that the straps include hook and loop material in a manner that allows easy adjustment of the straps in order to accommodate different infant transport devices. For example a stroller or an automobile child restraint seat may require that the device be attached to a thin cross bar, whereas attachment to a walker may require attachment to a small table like area.

A posture support apparatus according to claim 6 wherein the stabilization pad includes means, such as snap fasteners, for attachment of the stabilization pad to the straddleable support portion of the infant transport device.

Thus it can be appreciated that the disclosed invention offers advantages in universal applicability, hygiene, and ease of installation that could not be achieved with other known devices.

While these and other advantages and objects of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a perspective view of an infant posture support device mad according to the instant invention and mounted and in use in a stroller.

FIG. 2 s a perspective view of an infant posture support device mad according to the instant invention and mounted and in use in a walker.

FIG. 4 is a front elevational view of an infant posture support device made according to the instant invention.

FIG. 5 is a sectional view of an infant posture support device made according to the instant invention, the view taken from FIG. 4.

FIG. 6 shows an optional securement pad that attaches to the stabilization pad to help maintain the desired orientation of posture restraining device.

FIG. 6A is a side view of the optional securement pad shown on FIG. 6.

FIG. 7 is a front elevational view of an infant posture support device made according to the instant invention, the figure showing the installation and use of the infant posture support device in a stroller, the optional securement pad is shown attached, securing the stabilization pad on the straddleable support portion of the walker, or infant transport device.

FIG. 8 is a side view taken from FIG. 7 and illustrating the attachment of the posture support device on the brim and seat portion of a toller or of a walker.

FIG. 9 shows the stabilization pad attached about a narrow straddleable support portion of the infant transport device.

DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
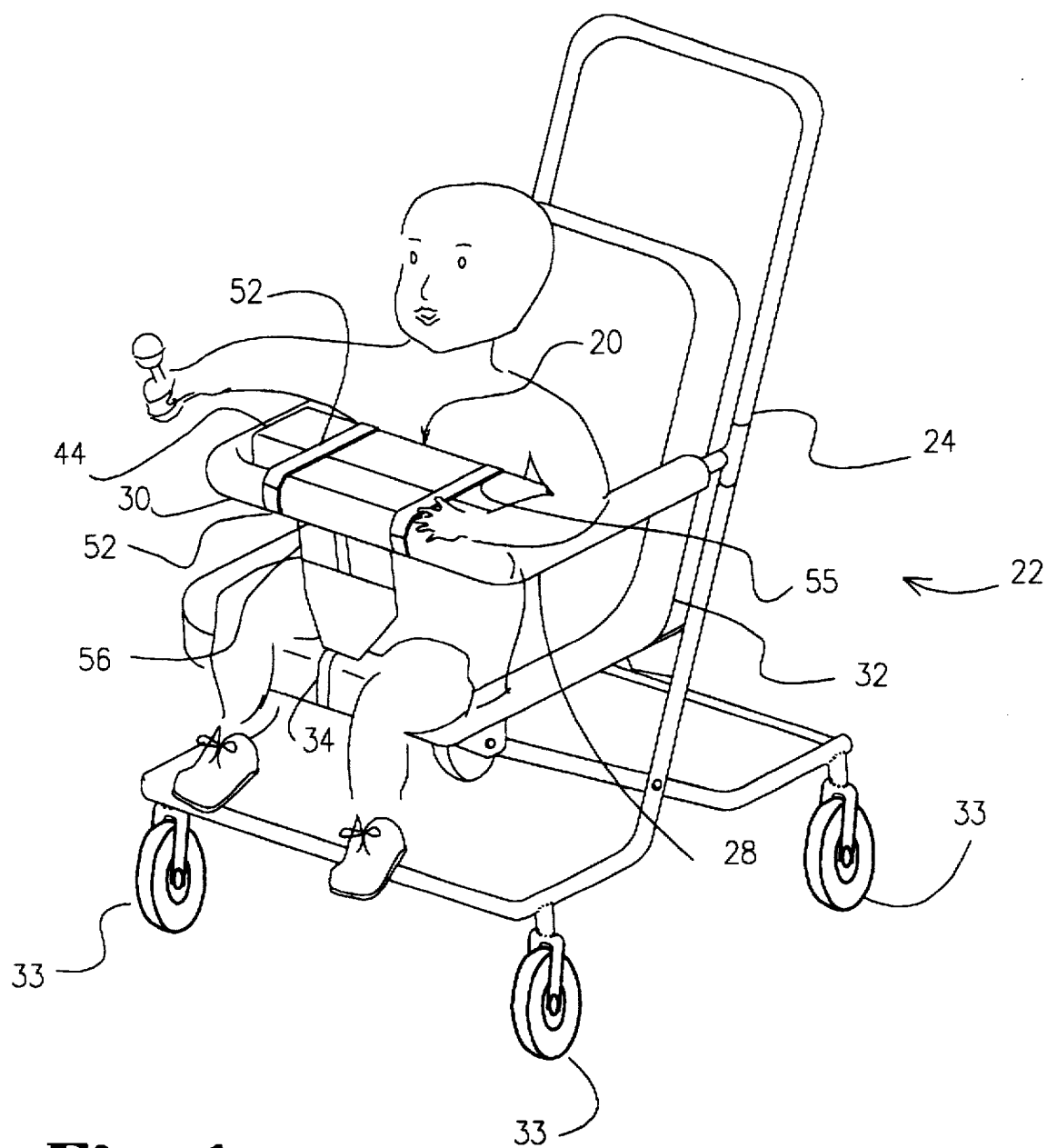
Figure 2:
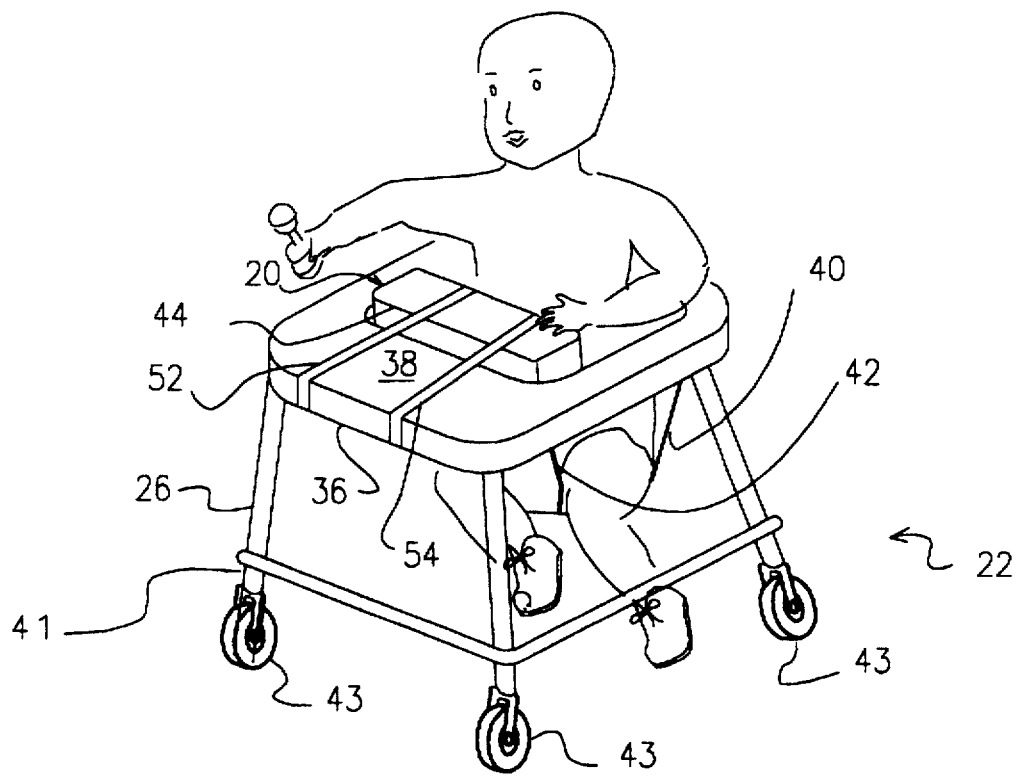

Turning now to FIGS. 1 and 2, which illustrate a preferred embodiment of the posture support apparatus 20 for supporting the posture of an infant while in an infant transport device 22. The infant transport device 22 shown in FIG. 1 being a stroller 24 and the infant transport device 22 shown in FIG. 2 being a walker 26. As has been illustrated in FIG. 1 the stroller 24 has a front portion 28 which includes a cross member 30. The stroller 24 also includes a seat 32, and wheels 33. Attached between the seat 32 and the cross member 30 is a straddleable support portion 34, which in the illustrated stroller 24 is a flexible strap. The straddleable support portion 34 is typically included as part of the stroller 24 in order to help support the weight of the infant as well as to secure the restraint and support of the infant using the stroller 24.

As illustrated in FIG. 2, the walker 26 also has a front portion 36. The front portion 36 of the walker 26 includes cross member 38 which in the illustrated walker 26 is a small flat, table like surface. Included in the walker 26 is a seat 40 on a frame 41 with wheels 43 which support and allow the infant to move in a well known manner. Between the seat 40 of the walker 26 and the cross member 38 of the walker 26 is a straddleable support 42 which attaches to the cross member 38 and attaches to the seat 40 of the walker 26. As is accomplished by the straddleable support 34 of the stroller 24, the straddleable support 42 portion of the walker 26 also serves to restrain and support a child in the seat 40 of the walker. Thus, it is clear that the instant invention may by used with a variety of infant transport devices, especially those transport devices that support a child in a seat having a straddleable portion extending from a cross member to the seat.

Figure 3:
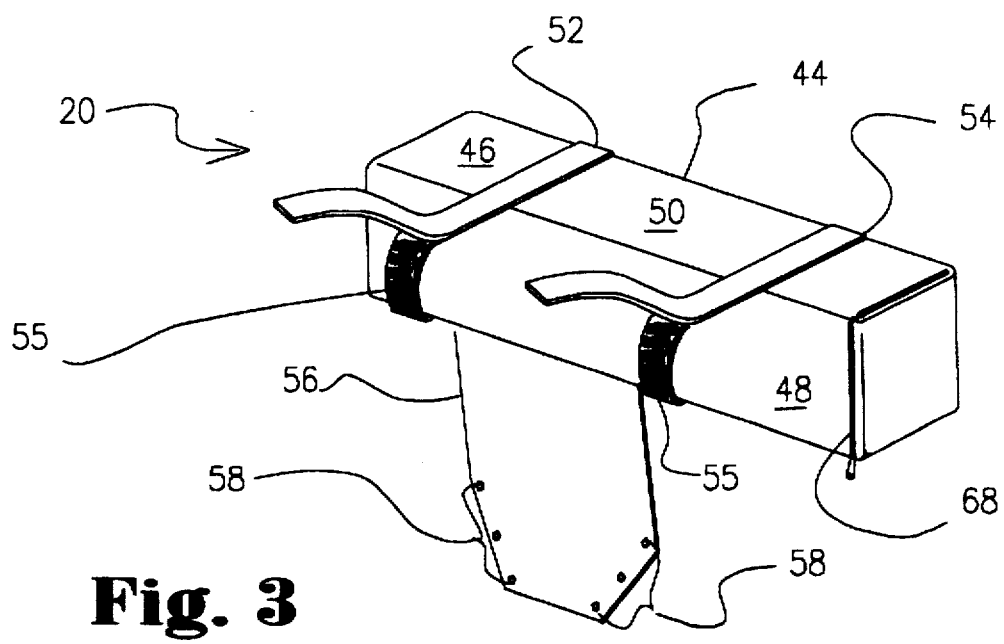
FIG. 3 is a perspective view of an infant posture support device made according to the instant invention.

Referring now to FIGS. 3 and 4 where it is shown that a highly preferred embodiment of the posture support apparatus 20 includes a longitudinal body 44 having a first end 46, a second end 48, which is opposite to the first end 46, and a mid-portion 50, which lies between the first end 46 and the second end 48.

Also illustrated on FIGS. 3 and 4 is that a first strap means 52 is attached to the longitudinal body 44, preferably at a substantially right angle to the longitudinal body 44 and between the first end 46 and the mid-portion 50 of the longitudinal body 44. A second strap means 54 is also attached to the longitudinal body 44 at a substantially right angle to the longitudinal body 44. The second strap means 54, however, is attached to the longitudinal body 44 between the mid-portion 50 and the second end 48 of the longitudinal body 44.

The first strap means 52 and the second strap means 54 are preferably made of a strong fabric material and will also include securement means such as hook and loop material on both of the strap means 52 and 54. This structure allows the strap means 52 and 54 to be wrapped around a cross member such as the cross member 30 found in the stroller 24 or the cross member 38 found in the walker 26. The attachment of hook and loop material may be accomplished by placing hook material one side of the straps 52 and 54, and placing loop material on the other side of the straps 52 and 54. Clearly, the same ability to synch the longitudinal body 44 against the cross members by means of the straps may be accomplished with a variety of other strap securing and adjusting means. However, in the preferred embodiment of the instant invention hook and loop material on opposite sides of the straps 53 and 54 is preferred due to the simplicity in manufacture and use.

Also illustrated in FIGS. 3 and 4 is a stabilization pad 54 which is attached to the mid-portion 50 of the longitudinal body 44. The stabilization pad 54 is preferably made from a section of soft fabric which may be sewn to the mid-portion 50 of the longitudinal body 44. As has been detailed in FIGS. 3 and 4, the stabilization pad 54 includes snap fasteners 58 which serve as means for attachment of the stabilization pad 54 to the straddleable support 42 of the walker 26 or the straddleable support 34 of the stroller 24 or other infant transport device. Thus, when installing the posture support apparatus 20 to an infant transport device such as the stroller 24 or the walker 24 or even an automobile child restraint seat one would synch or wrap the first strap means 54 and the second strap means 54 over the cross member of the infant transport device to hold the posture support apparatus against the cross member of the infant transport device. After the first strap means 54 and the second strap means 54 have been installed about the cross member of the infant transport device, the stabilization pad 56 may be attached to the straddleable support portion of the infant transport device to retain the posture support apparatus in a desired position relative to the infant transport device.

As shown in FIGS. 4–6 the stabilization pad 56 may be used with an optional securement pad 60 that attaches to the stabilization pad 56 by means of snaps 61 which mate with the snap fasteners 58 on the stabilization pad 56. The securement pad 60 serves to sandwich the straddleable support of the infant transport device in order to secure the position of the longitudinal body 44 relative to the cross member of the infant transport device.

Referring to FIG. 9 it is shown that the desired orientation of posture restraining device 20 on the infant transport device may be accomplished with the stabilization pad 56 alone. This may be done by simply wrapping the stabilization pad 56 about the straddleable support and attaching the snap fasteners 58 to one another to form a sleeve 62 which retains or holds the relationship of the stabilization pad 56 to the straddleable support.

Turning now to FIGS. 5 and 8, which are section views taken from FIGS. 4 and 7, respectively, it can be seen that the preferred embodiment of the posture support apparatus 20 the longitudinal body 44 is preferably defined by a hollow pliable enclosure 64 filled with a removeable padding 66. The advantage of this structure is that it allows the user to remove the padding g 66 in order to wash the hollow pliable enclosure 64 in a home washing machine, for example. Also, the use of removeable padding 66 allows the user to vary the stiffness of the longitudinal body 44 by simply varying the stiffness of the padding used. Moreover, it is clearly contemplated that the use of removeable padding allows the user to simply discard padding that has become soiled or otherwise ruined.

As illustrated in FIGS. 3 and 4, the posture support apparatus may also include a zippered aperture which permits the changing or removal of the removeable padding 66. Thus it can be appreciated that with this structure one can easily wash the desired portions of the posture support apparatus 20.

Thus to attach the disclosed posture support apparatus 20 to a walker, for example, one would place the posture support apparatus against the cross member of the infant transport device 22 and, as shown on FIG. 8, wrap the first strap means 52 as well as the second strap means 54 about the cross member until it reaches the longitudinal body 44. The securement means on the strap means 52 being hook and loop type material will allow precise adjustment and holding of the strap means 52 and 54 so that a snug, secure fit is ensured. Then, the stabilization pad 56 would be attached or secured about the straddleable support portion 34 by either attaching the securement pad 60 or by forming a sleeve 62 about the straddleable support portion 34 as described earlier. While it is contemplated that the stabilization pad 56 be attached to in a manner described above, it is also contemplated that snaps that mate with the snaps on the stabilization pad 56 may also be incorporated into the straddleable support 34. Thus it is clear that the disclosed stabilization pad prevents the longitudinal body 44 from sliding over the cross members 30 or 38, and allowing the longitudinal body to fill the area in front of the infant's body and between the cross member of the infant transport device.

In light of the above, it is clear that it is also contemplated that while the cross section of the longitudinal body has been shown in FIGS. 5 and 8 to be substantially square or rectangular, it is contemplated that a variety of cross section may be advantageously employed. However, it should be kept in mind that the illustrated preferred embodiment of the instant invention includes a cross section that simplifies manufacture, installation, and cleaning.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A posture support apparatus for supporting the posture of an infant while in an infant transport device having a front portion a straddleable support portion and a cross member adapted for extending across the front portion of the infant transport device, the posture support apparatus comprising:

a longitudinal body having a first end, a second end opposite the first end, and a mid-portion between the first end and the second end;

a first strap means attached to said longitudinal body between the first end and the mid-portion;

a second strap means attached to said longitudinal body between the mid-portion and the second end; and a stabilization pad attached to the mid-portion of said longitudinal body, the stabilization pad being adapted for attachment to the straddleable support portion of the infant transport device, so that the first strap means and the second strap means may be extended over the cross member of the infant transport device to hold the posture support apparatus against the infant transport device and the stabilization pad may be attached from the straddleable support portion of the infant transport device to retain the posture support apparatus in a desired position relative to the infant transport device.

2. A posture support apparatus according to claim 1 wherein said longitudinal body is a hollow pliable enclosure filled with a removeable padding.

3. A posture support apparatus according to claim 1 wherein said first strap means further includes securement means for securing the strap means about the cross member of the infant transport device.

4. A posture support apparatus according to claim 3 wherein the securement means include hook and loop material.

5. A posture support apparatus according to claim 4 wherein said second strap means further includes securement means for securing the strap means about the cross member of the infant transport device.

6. A posture support apparatus according to claim 5 wherein the securement means includes hook and loop material.

7. A posture support apparatus according to claim 6 wherein the stabilization pad includes means for attachment to the straddleable support portion of the infant transport device.

8. A posture support apparatus according to claim 7 wherein the stabilization pad said means for attachment to the straddleable support portion of the infant transport device comprises snap means.

9. A posture support apparatus for supporting the posture of an infant while in an infant transport device having a front portion a straddleable support portion and a cross member adapted for extending across the front portion of the infant transport device, the posture support apparatus comprising:

a longitudinal body having a first end, a second end opposite the first end, and a mid-portion between the first end and the second end;

a first strap means attached to said longitudinal body between the first end and the mid-portion, the first strap being attached to said longitudinal body such that the first strap is at a substantially right angle to the longitudinal body;

a second strap means attached to said longitudinal body between the mid-portion and the second end, the second strap being attached to said longitudinal body such that the second strap is at a substantially right angle to the longitudinal body; and a stabilization pad attached to the mid-portion of said longitudinal body, the stabilization pad being adapted for removable attachment to the straddleable support portion of the infant transport device, so that the first strap means and the second strap means may be extended over the cross member of the infant transport device to hold the posture support apparatus against the cross member of the infant transport device and the stabilization pad may be attached from the straddleable support portion of the infant transport device to retain the posture support apparatus in a desired position relative to the infant transport device.

10. A posture support apparatus according to claim 9 wherein said longitudinal body is a hollow pliable enclosure filled with a removeable padding.

11. A posture support apparatus according to claim 10 wherein said first strap means further includes securement means for securing the strap means about the cross member of the infant transport device.

12. A posture support apparatus according to claim 11 wherein said second strap means further includes securement means for securing the strap means about the cross member of the infant transport device.

13. A posture support apparatus according to claim 12 wherein the stabilization pad includes means for attachment to the straddleable support portion of the infant transport device.

14. A posture support apparatus according to claim 13 wherein the stabilization pad said means for attachment to the straddleable support portion of the infant transport device comprises snap means.

15. A posture support apparatus for supporting the posture of an infant while in an infant transport device having a frame having wheels, a front portion, a straddleable support portion and a cross member adapted for extending across the front portion of the infant transport device, the posture support apparatus comprising:

a hollow longitudinal body having a first end, a second end opposite the first end, and a mid-portion between the first end and the second end, the hollow body having a closeable means for filling the body with cushion material;

a first strap means attached to said longitudinal body between the first end and the mid-portion, the first strap being attached to said longitudinal body such that the first strap is at a substantially right angle to the longitudinal body;

a second strap means attached to said longitudinal body between the mid-portion and the second end, the second strap being attached to said longitudinal body such that the second strap is at a substantially right angle to the longitudinal body; and a stabilization pad attached to the mid-portion of said longitudinal body, the stabilization pad being adapted for attachment to the straddleable support portion of the infant transport device, so that the first strap means and the second strap means may be extended over the cross member of the infant transport device to hold the posture support apparatus against the infant transport device and the stabilization pad may be attached from the straddleable support portion of the infant transport device to retain the posture support apparatus in a desired position relative to the infant transport device.

16. A posture support apparatus according to claim 15 wherein the stabilization pad includes means for attachment to the straddleable support portion of the infant transport device.

17. A posture support apparatus according to claim 16 wherein the stabilization pad said means for attachment to the straddleable support portion of the infant transport device comprises snap means.

18. A posture support apparatus according to claim 16 wherein said first strap means further includes securement means for securing the strap means about the cross member of the infant transport device.

19. A posture support apparatus according to claim 18 wherein said second strap means further includes securement means for securing the strap means about the cross member of the infant transport device.

* * * * *